3 Sheets—Sheet 1.

F. E. SICKELS.

Steam Engine.

No. 1,107. Reissued Jan'y 1, 1861.

Witnesses:
H. S. Myer
B. M. Reid

Inventor:
F. E. Sickels

N. PETERS, Photo-Lithographer, Washington, D. C.

3 Sheets—Sheet 2.

F. E. SICKELS.

Steam Engine.

No. 1,107.

Reissued Jan'y 1, 1861.

Witnesses:

F. S. Myers

B. McKeed

Inventor:

F. E. Sickels

N. PETERS. Photo-Lithographer. Washington. D. C.

3 Sheets—Sheet 3.

F. E. SICKELS.

Steam Engine.

No. 1,107.

Reissued Jan'y 1, 1861.

Witnesses:

T. E. Sickels

F. J. Murphy

Inventor:

Frederick E. Sickels

N. PETERS, Photo-Lithographer, Washington, D. C.

UNITED STATES PATENT OFFICE.

FREDERICK E. SICKELS, OF NEW YORK, N. Y.

IMPROVEMENT IN STEAM-ENGINES.

Specification forming part of Letters Patent No. 4,202, dated September 19, 1845; extended seven years; Reissue No. 912, dated February 21, 1860; Reissue No. 1,107, January 1, 1861.

DIVISION B.

*To all whom it may concern:*

Be it known that I, FREDERICK ELSWORTH SICKELS, of the city, county, and State of New York, have invented a new and useful Improvement in Paddle-Wheels; and I do hereby declare that the following is a full, clear, and exact description of the character thereof, which distinguishes it from all other things before known, and of the manner of making and using the same, reference being had to the accompanying drawings, which make a part of this specification.

The nature of my improvement consists in placing upon the arms of a paddle-wheel buckets or floats of varying area, increasing from two opposite points upon the wheel, and thus graduating the resistance of the wheel to the varying power of the engine applied to the wheel, by which the wheel is made to turn more readily when working the engine by hand, as well as greater efficiency secured when the engine is hooked on.

Figure 1:
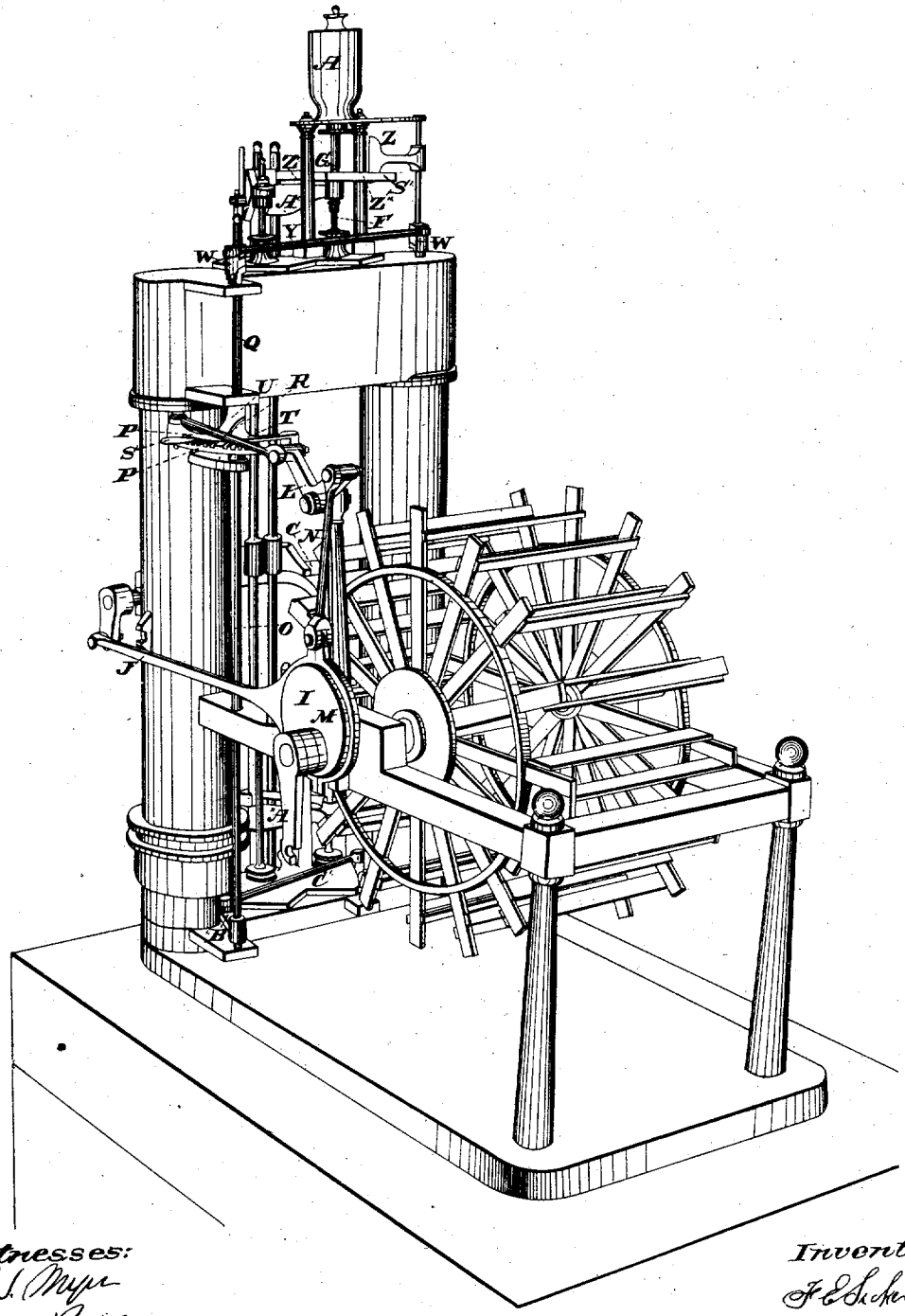
Figure 2:
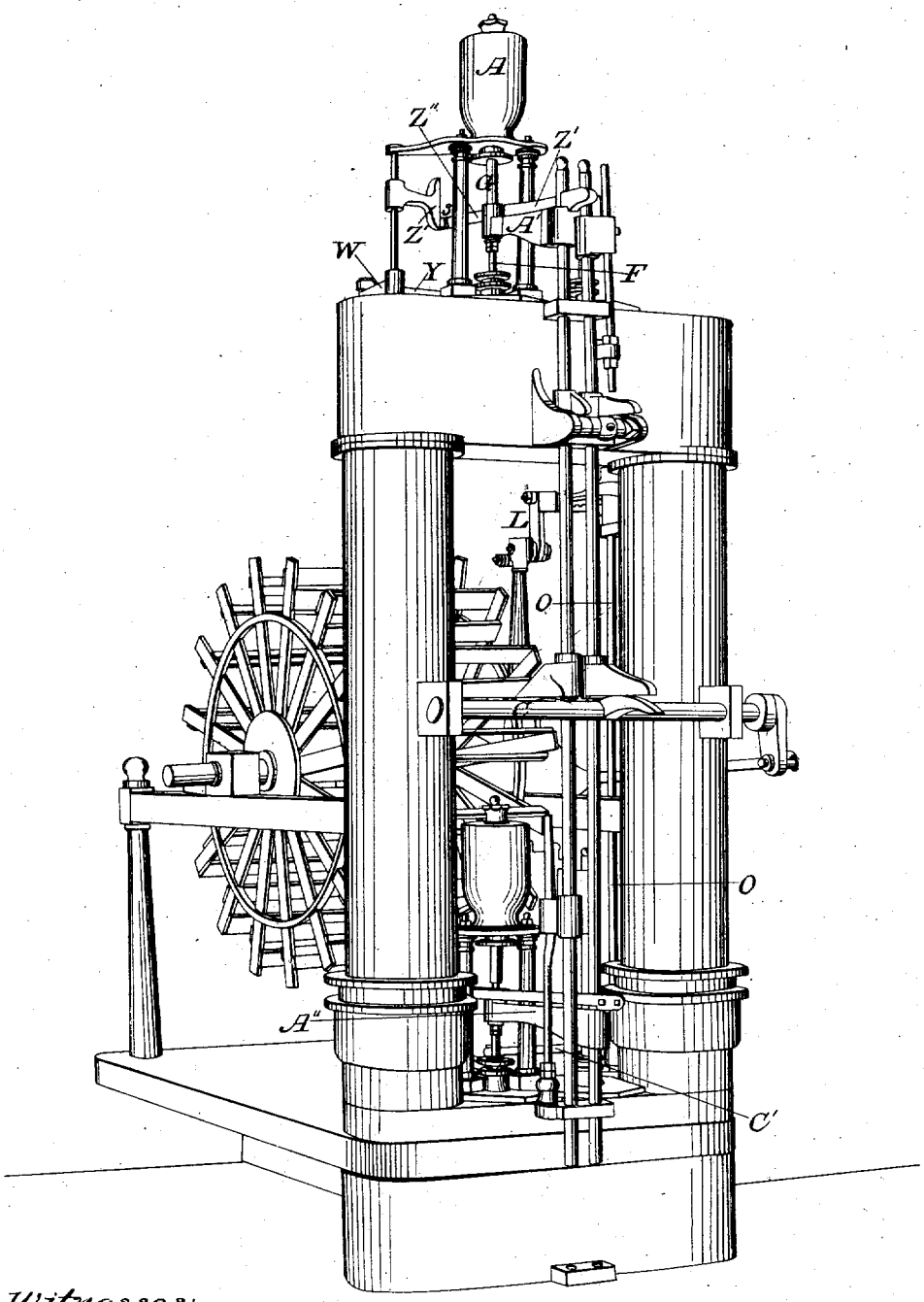
Figure 3:
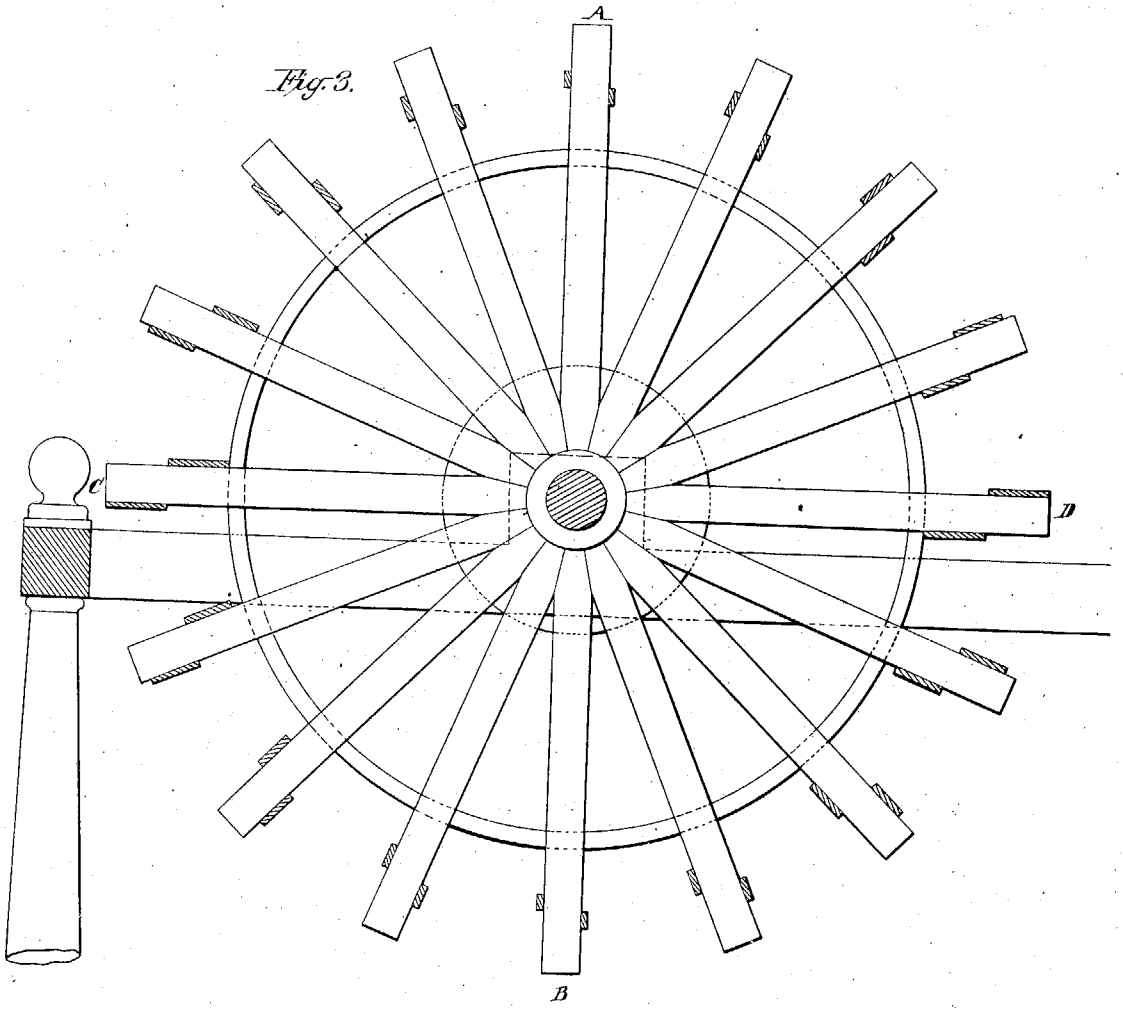

In drawings Figures 1 and 2 this improvement is shown in connection with other improvements, which it is not necessary here to describe. Fig. 3 is a side view of the wheel.

It will be seen by reference to the drawings that the wheel is shown having buckets of increasing area from two opposite points, A B, to two other opposite points, C D, and then diminishing to the points A B.

Fig. 3 is a side view of the wheel, showing the proportions of the areas of the buckets; but these may be varied in their increasing and diminishing sizes, as the circumstances of each case may require, or as may be most practicable, it being understood that this form of wheel is especially applicable to be operated by single reciprocating steam-engines, that form of engine varying greatly in the application of the power of the engine to the wheel during each revolution. The larger area of buckets should be in action when the engine is exerting the most power, and the smaller area when the engine is exerting the least power.

Having thus fully described and shown the nature and character of my improvement, what I claim as new, and desire to secure by Letters Patent, is—

The paddle-wheel, constructed with buckets of varying areas, substantially as described.

FREDERICK E. SICKELS.

Witnesses:

T. E. SICKELS,

F. I. MURPHEY.